(12) United States Patent
Bonisch

(10) Patent No.: US 6,708,926 B2
(45) Date of Patent: Mar. 23, 2004

(54) MODULAR INTEGRATED SELF-CONTAINED CARGO DEPLOYMENT/RETRIEVAL SYSTEM

(75) Inventor: Frank H. Bonisch, Milford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 10/156,899

(22) Filed: May 28, 2002

(65) Prior Publication Data

US 2003/0222177 A1 Dec. 4, 2003

(51) Int. Cl.⁷ .................................................. B64D 1/02
(52) U.S. Cl. ............................... 244/137.1; 244/137.3; 244/1 TD
(58) Field of Search ........................... 244/137.1, 137.2, 244/137.3, 137.4, 1 TD; 114/235 R, 235 A, 235 B, 235 F, 210, 244, 253, 254; 254/326, 335, 413, 415; 258/1.2

(56) References Cited

U.S. PATENT DOCUMENTS

| | | | | | |
|---|---|---|---|---|---|
| 3,782,319 A | * | 1/1974 | Hale | ....................... | 114/235 B |
| 4,298,176 A | * | 11/1981 | Kendall | ................... | 244/135 A |
| 4,598,882 A | * | 7/1986 | Opdahl | .................... | 244/1 TD |
| 4,890,751 A | * | 1/1990 | Opdahl | .................... | 244/1 TD |
| 5,137,193 A | * | 8/1992 | McDonald | ............... | 244/1 TD |
| 5,260,820 A | * | 11/1993 | Bull et al. | ................... | 359/145 |
| 6,056,236 A | * | 5/2000 | Weimer et al. | ........... | 244/1 TD |

* cited by examiner

Primary Examiner—Galen L. Barefoot
(74) Attorney, Agent, or Firm—Bachman & LaPointe, P.C.

(57) ABSTRACT

The present invention relates to self contained, modular integrated deployment and retrieval system for use with an aircraft such as a helicopter. The deployment and retrieval system comprises a support frame, a winch connected to the support frame, a tow cable wound around the winch, which tow cable is connected to the external load, and a support structure connected to the support frame. The support structure is axially movable relative to the support frame for moving the external load so as to control the center of gravity of the aircraft and so as to deploy and retrieve the external load.

51 Claims, 5 Drawing Sheets

MODULAR INTEGRATED SELF-CONTAINED CARGO DEPLOYMENT/RETRIEVAL SYSTEM

BACKGROUND OF THE INVENTION

The present invention relates to a system and a method for more efficiently deploying and retrieving large external loads from an aircraft, such as a helicopter.

Currently, the U.S. Navy and the Japanese Maritime Self Defense force deploy and retrieve airborne mine counter measures (AMCM) equipment using a system 10 such as that shown in FIG. 1. The system 10 includes a tow boom 12, a winch 14, a davit 16, a cradle 18, a modified aircraft ramp 20 capable of moving from an up and closed position to a 90 degree (vertically down) open position, and an aperture guard 19. Airborne mine counter measure deployment and retrieval operations are performed as follows. The tow boom 12 is moved from its center line stowed position to a side stow position. The winch cable 22 is unwound from the winch 14 aft to the davit sheave 24. The davit sheave cable retainer is opened and the cable 22 is laid on the sheave 24 and locked in place by closing the davit cable retainer. The cable 22 is then run to and attached to the towed body 28. The towed body 28 is unstrapped from its transport cradle 18. The davit 16 is rotated aft from its stowed forward position while the winch 14 is then activated, lifting the towed body 28 from its cradle 18. At the same time, the ramp 20 is lowered to further increase the clearance between the cradle 18 and the towed body 28. Continuous rotation aft of the davit 16 is maintained as the ramp 20 is now also lowered until the towed body 28 fully clears the ramp 20 and the cradle 18. The towed body 28 is then further lowered until it enters the water by a synchronous operation of the winch 14 and the davit 16. A tow ball is secured to the tow cable 22. The tow boom 12 is rotated to the aircraft center line and lowered over the tow cable 22 and the tow ball. The tow cable 22 is played off the winch 14 to trap the tow ball in the tow hook 34. A guillotine is placed over the tow cable 22 and secured to the aft facing end of the tow boom tow hook 34. The aircraft is now ready to begin tow operations. Towed body retrieval is the reverse of this procedure, with the additional crew task of using a manually held pole to stabilize and correct the attitude of the towed body 28 as it approaches the aircraft.

This prior art system is very inefficient and can have a large weight impact on the basic aircraft. This prior art system also is very labor intensive and has high risk tasks associated with it. Still further, this prior art system requires extensive fuselage modifications.

SUMMARY OF THE INVENTION

Accordingly, it is an object of the present invention to provide a system and a method for deploying and retrieving large external loads from an aircraft such as a helicopter.

It is a further object of the present invention to provide a system and a method as above which is simpler to use.

It is still a further object of the present invention to provide a system as above which is self-contained and modular in nature.

It is yet a further object of the present invention to provide a deployment and retrieval system which can be integrated into an existing aircraft structure with minimum structural modifications.

The foregoing objects are attained by the deployment and retrieval system and method of the present invention.

In accordance with the present invention, a system for deploying and retrieving an external load from an aircraft, such as a helicopter, broadly comprises a support frame, a winch connected to the support frame, a tow cable wound around the winch, which tow cable is connected to the external load, and a support structure connected to the support frame. The support structure is axially movable relative to the support frame for moving the external load so as to aid in deploying the load or aid in controlling the center of gravity of the aircraft.

Further, in accordance with the present invention, a method for deploying and retrieving an external load from an aircraft broadly comprises the steps of providing a self contained modular deployment and retrieval system which includes a support frame, a winch connected to the support frame, and an axially movable support structure connected to the support frame for supporting a sheave, passing a tow cable on the winch over the sheave and connecting an end of the tow cable to the external load, and moving the support structure relative to the support frame from a retracted position to a deployed position so that the external load passes through an opening in the aircraft.

Other details of the modular integrated self contained cargo deployment and retrieval system of the present invention, as well as other objects and advantages attendant thereto, are set forth in the following detailed description and the accompanying drawings wherein like reference numerals depict like elements.

DETAILED DESCRIPTION OF THE PREFERRED EMBODIMENT(S)

Figure 1:
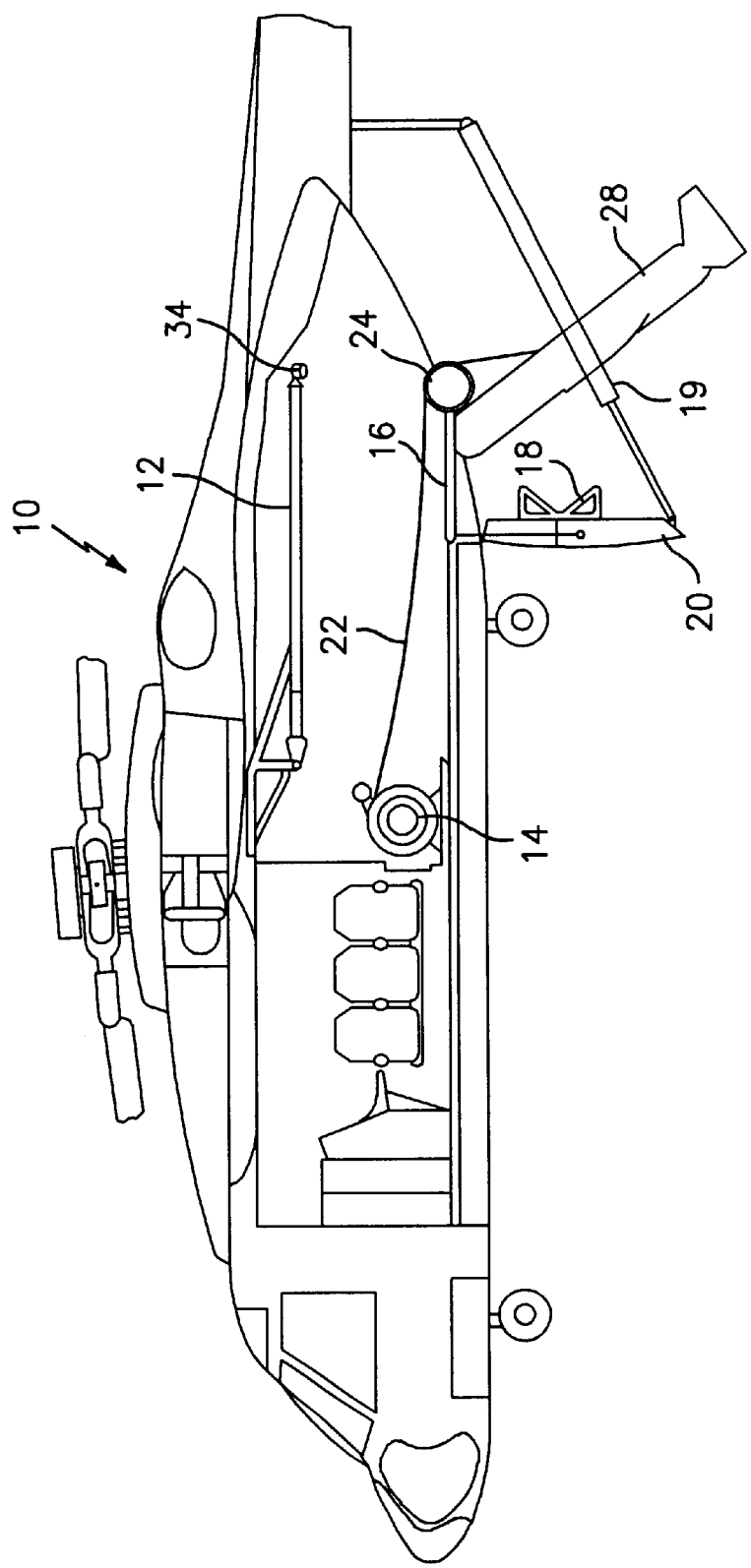
FIG. 1 illustrates a prior art system for deploying airborne mine counter measures.
Figure 2:
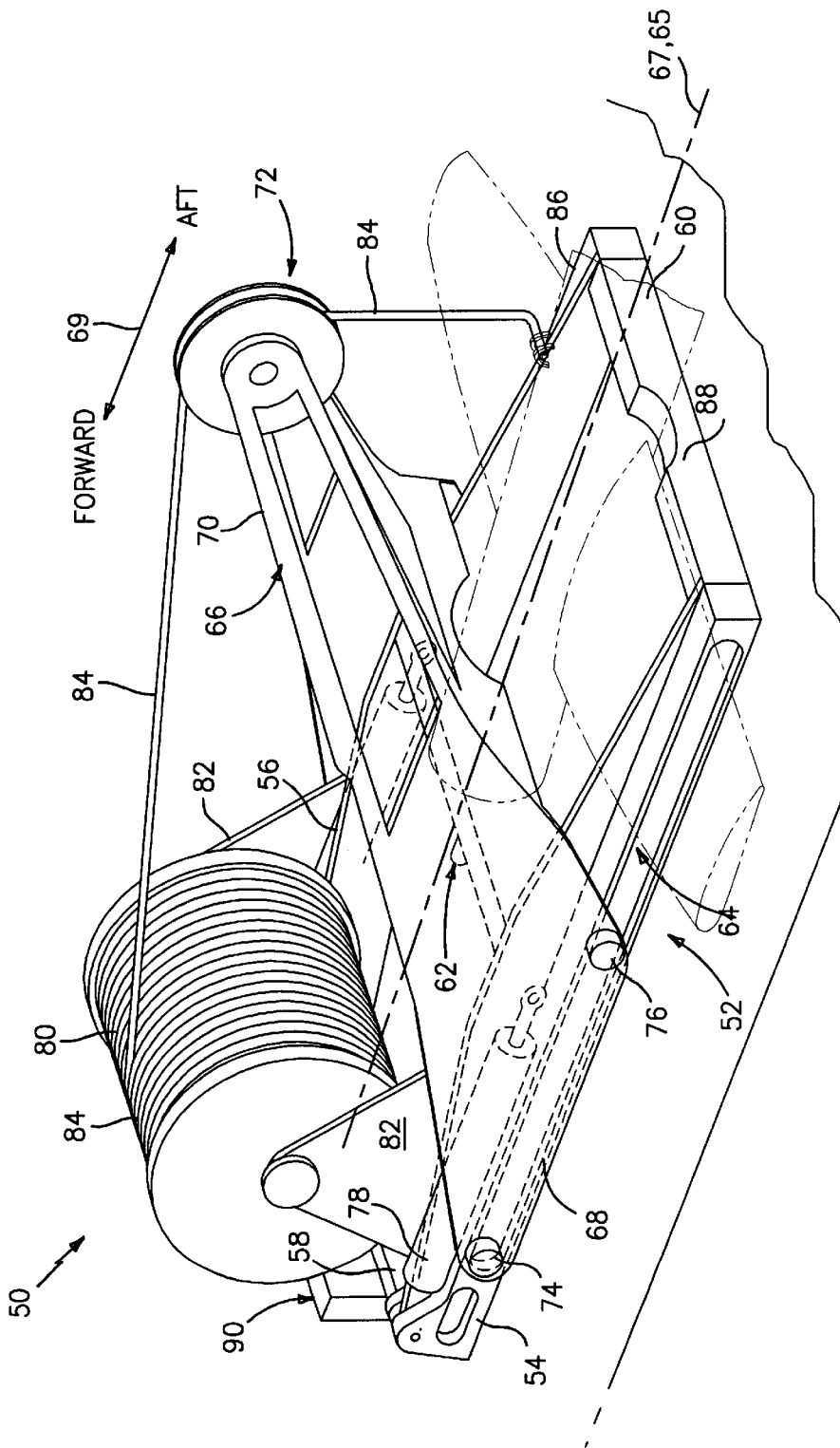
FIG. 2 is a schematic representation of a modular integrated self contained cargo deployment and retrieval system in accordance with the present invention.
Figure 3:
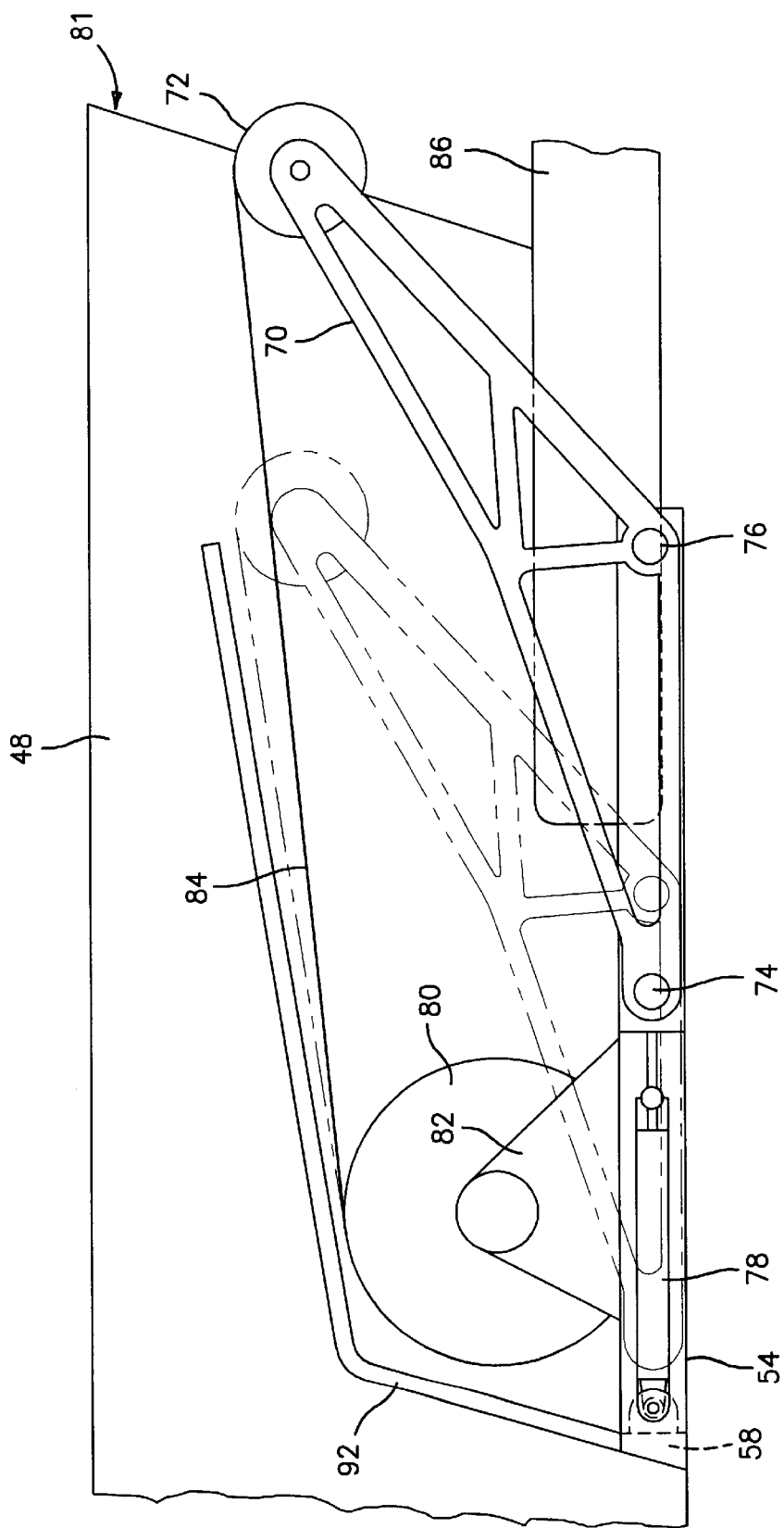
FIG. 3 is a schematic representation of the system of FIG. 2 moved from a retracted position to a deployed position.

Referring now to FIGS. 2 and 3, a modular integrated self contained cargo deployment and retrieval system 50 in accordance with a first embodiment of the present invention is illustrated. The deployment and retrieval system 50 may be installed a wide variety of helicopters, each having a fuselage 48. The system 50 includes a modular structural support frame 52 having side rails 54 and 56, end walls 58 and 60, and energy absorbing member 62 extending between the side rails 54 and 56. The energy absorbing member 62 serves a number of functions. First, it stabilizes the support frame 52. Second, it acts as a forward crash restraint for an external load 86 to be deployed and retrieved. Each of the side rails 54 and 56 is provided with a track 64 whose purpose will be discussed hereinafter. The track 64 may take the form of a longitudinally extending slot such as that shown in FIGS. 2 and 3. Alternatively, each track 64 may be a top surface and/or a side surface of a respective side rail 54, 56. The support frame 52 and its various components may be formed from any suitable lightweight metallic, non-metallic, or composite materials known in the art.

The system 50 further includes an axially movable support structure 66 connected to the support frame 52. The support structure 66 is movable along an axis 69 parallel to the center line 67 of the aircraft in which the system 50 is installed between the retracted and deployed positions shown in FIG. 3. The axially movable support structure 66 includes side elements 68 and support arms 70 for supporting a sheave 72. Each of the side elements 68 has engagement means 74 and 76, such as forward and aft rollers and slide elements (or pins), which cooperate with and move along the track 64. Positive motion and positioning of the support structure 66 is provided by the engagement means 74 and 76 cooperating with the track 64. The side elements 68 and support arms 70 may be formed from any suitable metallic or non-metallic, or composite material known in the art.

The modular system 50 further includes a pair of actuators 78 for moving the support structure 66 relative to the support frame 52. Each of the actuators 78 is connected at one end to the support frame 52 and at the other end to part of the support structure 66 such as one of the side elements 68. The actuators 78 may comprise any suitable hydraulic or electrically operated actuators known in the art. The actuators 78 impart a linear movement to the support structure 66 that allows the external load 86 to be moved fore and aft in the aircraft for center of gravity control as well as for deployment and retrieval. While a pair of actuators 78 has been shown, if desired, only one actuator 78 may be provided to move the support structure 66 relative to the support frame 52. Alternatively, one may be use more than two actuators 78 if desired.

Also mounted to the support frame 52 is a winch 80. Any suitable means known in the art such as side arms 82 may be used to secure the winch 80 to the support frame 52. Wound onto the winch 80 is a tow cable 84. The tow cable 84 is attached at a first end to the winch 80 and at a second end to the external load 86 to be deployed and retrieved. The external load 86 may be a towed body such as one used in airborne mine counter measure operations, a rescue basket, fire fighting equipment, or equipment to be deployed at inaccessible topographical locations. A notch or a raised support cradle structure 88 may be provided in the end wall 60 so that the external load 86 may rest and be secured in a retracted or transport position.

To make the system 50 truly modular, hydraulic or electric controls and operational monitoring equipment 90 are also mounted on the support frame 52. The controls 90 may include rotational and linear sensors and video cameras which synchronize linear motion of the sheave 72 with motion of the winch 80. Synchronized sensing permits the external load 86 to remain captured to and controlled by the system 50. Controls 90 also permit operators to be safely displaced from possible hazardous operations.

The system 50 may be installed in an aircraft fuselage using any suitable means known in the art such as by shear and/or tension connections. When installed, the system 50 is preferably aligned so that the longitudinal axis 65 of the support frame 52 coincides with the center line 67 of the aircraft. Further, by securing the support frame 52 in the shear planes of the floor and fuselage frames, complex fuselage modifications can be eliminated and excessive torsional and bending loads may be reduced.

In use, the support structure 66 is moved relative to the support frame 52 via the actuators 78 from a retracted position to a deployed position where the external load 86 is extended through an opening 81 in the aircraft fuselage. The opening 81 can be a rear door opening on the aircraft. The winch 80 is then operated to deploy the external load 86 via the tow cable 84. To retrieve the external load 86, the winch 80 is operated to wind the tow cable 84 onto the winch 80. When the external load 86 is above the level of the opening 81, the actuators 78 are then operated to again move the support structure 66 relative to the support frame 52 from the deployed position to the retracted position. It should be noted that when the support structure 66 is in its retracted position, the sheave 72, the energy absorbing structure 62, and the notched member or the raised cradle structure 88 provide crash restraint capabilities for the external load 86 in all degrees of freedom.

If desired, the winch 80 may be connected to the support frame 52 so that the winch moves forward and aft with the support structure 66. By providing such an arrangement, one can use the winch 80 to control the aircraft center of gravity during deployment and towing.

As shown in FIG. 3, a removable shield 92 may be secured over the modular system 50. The shield 92 may be formed from any suitable protective material known in the art and may be secured to the frame 52 using any suitable means known in the art. If desired in lieu of the shield 92, a barrier arrangement may be provided in front of the support frame 52 to reduce noise, to reduce hazards, and to control the environment of the aircraft.

Figure 4:
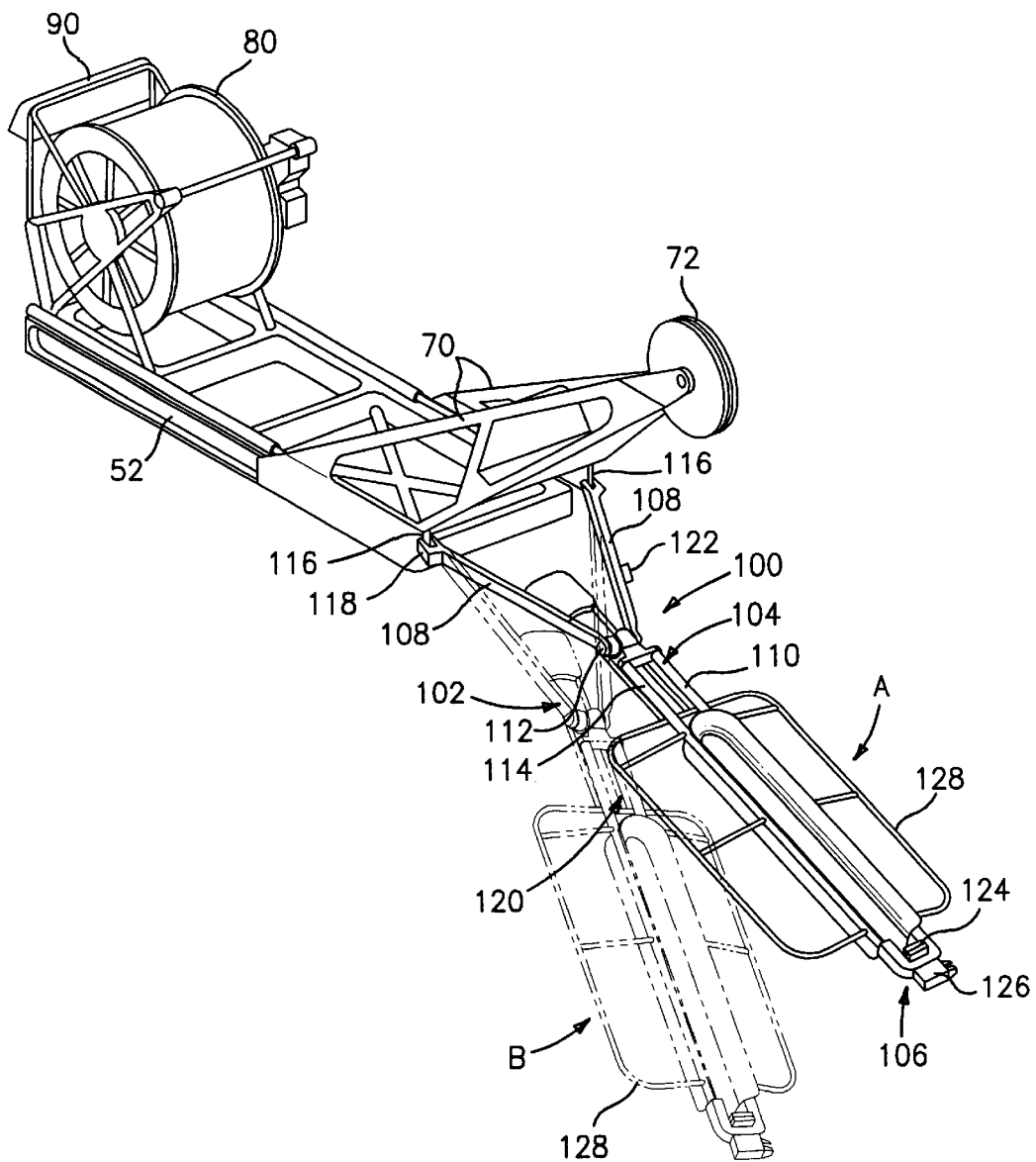
FIG. 4 illustrates a tow boom which may be used with the deployment and retrieval system of FIG. 2.

Referring now to FIG. 4, the system 50 may include a Y-shaped tow boom 100 for capturing the tow cable 84 during deployment of the external load. The tow boom 100, in a preferred embodiment, has support legs 102 and 104 which may be pivotally connected to a portion of the support structure 66, such as the side elements 68. Each of the legs 102 and 104 terminates in a tow ball capture device 106 which includes a tow hook 124 and a pyrotechnic cable cutter 126. In a preferred embodiment, each leg 102 and 104 has a first leg portion 108 and a second leg portion 110 connected to the first leg portion 108 by a hinge or universal joint connection 112. Each connection 112 preferably has a locked position and an unlocked position. Load cells and yaw sensors 114 may be incorporated into either leg portion 108 or 110 of each support leg 102 and 104 to provide automatic tow tension indication to prevent overloads. The pivotal connections 116 between the legs 102 and 104 and the support structure 66 may include pitch sensors 118 to detect the angular position of the tow boom 100 relative to the aircraft. If desired, one or more remote video cameras 122 may be mounted to the tow boom 100 to provide visual surveillance of the tow boom 100.

When the external load 86 is in a transport or pre-deployment mode, the tow boom 100 takes position A shown in FIG. 4. In this position, the tow boom 100 is retracted or located above the external load 86. As the external load 86 is deployed, the tow boom 100 pivots about two horizontal axes defined by the pivotal connections 116 and the connection(s) 112, thus enabling the tow boom 100 to move in a vertical plane. As the external load 86 is being deployed, the tow boom 100 follows its downward motion, unfolds, and moves into the truss configuration shown in FIG. 4 as position B. The tow cable 84 is thus suspended through a cable control window 120 formed by the leg portions 110, the tow hook 124 and the pivotal connections 112 of the tow boom 100, thus eliminating any need for an aperture guard.

To engage the tow cable 84 in the tow hook 124 at the apex of the tow boom 100, the aircraft is transitioned to a tow mode which moves the tow cable 84 aft. This results in the tow cable 84 being trapped in the tow hook 124 by means of a cable diameter increasing device such as a tow ball. The cable diameter increasing device prevents the cable 84 from passing through the tow hook 124. At the same time, the pyrotechnic cable cutter 126 surrounds the tow cable 84 in the event that it is needed. To disengage the tow cable 84 during retrieval of the external load 86, the winch 84 is activated. This pulls the cable diameter increasing device of the tow cable 84 out of the tow hook 124. As the external load 86 is retracted, it automatically unlocks the connections 112 when it contacts the tow boom, allowing the tow boom to fold and retract back to position A. If desired, the winch 80 may be used to fold and retract the tow boom 100.

The tow boom 100 can be manufactured from any suitable lightweight material, such as composite materials, to reduce its weight.

If desired, a containment device 128 may be affixed to the tow boom 100 to protect the external load 86. The containment device 128 may be formed from any suitable material.

The tow boom 100 forms a cable guide replacing the old aperture guards. This helps to automate the tow hook/tow ball arrangement and keep cables away from the tail rotor of a helicopter. The tow boom 100 can be made to automatically fold upon retrieval of the external load, thereby guiding the capture of the load and eliminating the manually held pole of the old systems.

The system 50 of the present invention provides numerous other advantages. First and foremost, the system 50 is modular in nature and self-contained. In other words, all the components of the system needed to deploy and/or retrieve an external load 86 are provided in one unit. Other advantages to the system 50 include elimination of cumbersome cabin cluttering tie down straps used on other systems as a result of the winch 80 being secured to the support frame 52. Any need to modify the aft aircraft structure and provide a ramp with 90 degree lowering capabilities are also eliminated by the system 50. Still further, the system 50 has low weight impact on the aircraft in which it is installed because fixed provisions are minimal. Also, the construction of the system 50 and its component locations enhance the center of gravity/weight distribution parametric of the aircraft. As can be seen from the foregoing description, the system 50 provides a safer crew operating environment because many of the automated features eliminates high risk tasks associated with the previous systems and is less labor intensive. The system 50 also may be easily and rapidly installed and removed from an aircraft. Still further, the system 50 can be functionally tested and fine-tuned on the ground prior to aircraft installation, resulting in minimum impact on aircraft in-service hours. Multiple mission components, connecting structure and supporting hardware, electronics, and hydraulics can be integrated.

Figure 5:
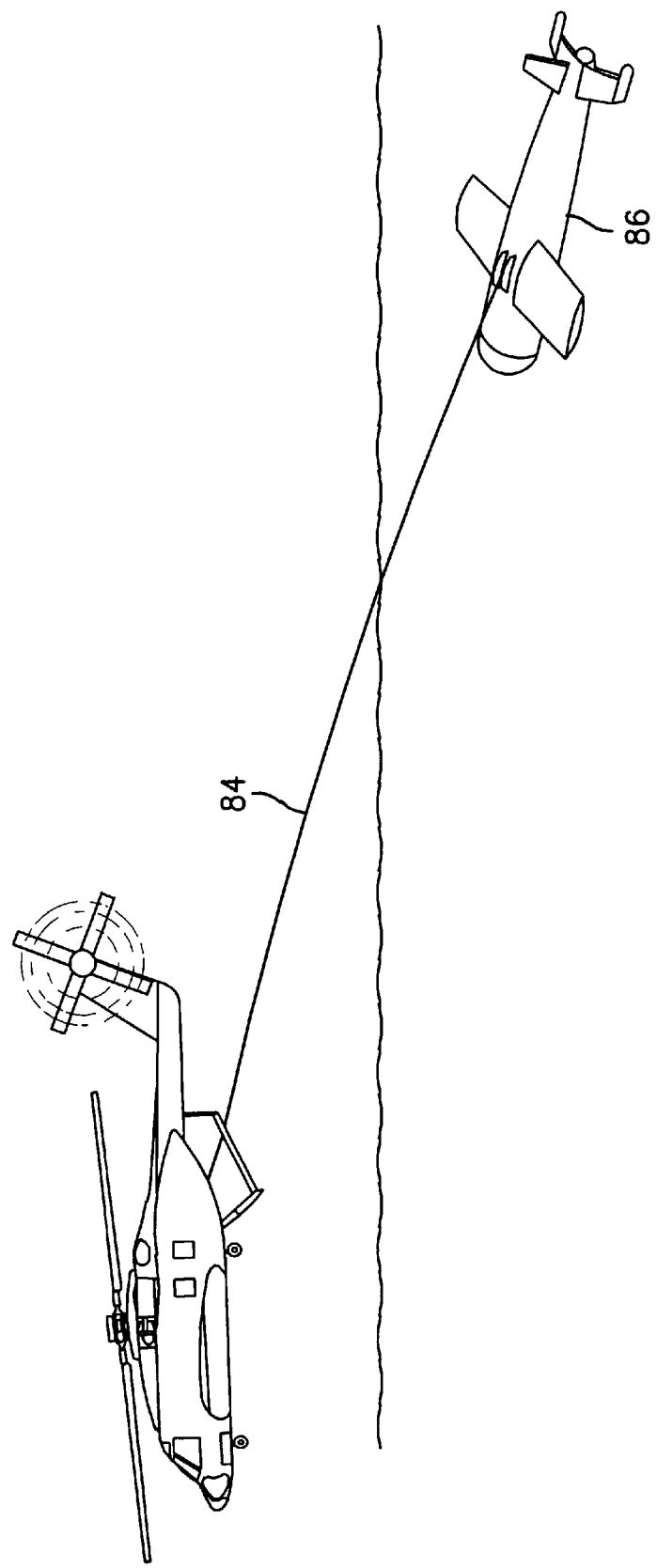
FIG. 5 is a schematic representation of a mine hunting system which utilizes the deployment and retrieval system of the present invention.

The system 50 may be used with a helicopter as part of a minehunting system such as that shown in FIG. 5 wherein the external load 86 is a towed body containing a high resolution, side-looking, multibeam sonar system that is used for minehunting along the ocean bottom.

The deployment and retrieval system 50 of the present invention has been described in the context of a helicopter having a rear door opening. It should be noted that the system 50, either in the form described above, or in a modified form, may be used with a wide variety of helicopters and potentially fixed wing aircraft.

It is apparent that there has been provided in accordance with the present invention a modular integrated self contained cargo deployment and retrieval system which fully satisfies the objects, means and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations, as fall within the broad scope of the appended claims.

What is claim is:

1. A system for deploying and retrieving an external load from an aircraft comprising:

a support frame;

a winch connected to said support frame;

a tow cable wound around said winch, said tow cable being connected to said external load;

a support structure connected to said support frame, said support structure being axially movable relative to said support frame for moving said external load so as to control the center of gravity of said aircraft;

means for moving said support structure relative to said support frame; and said moving means comprising a pair of actuators connected to said supports structure and to said support frame.

2. A system according to claim 1, further comprising:

said support frame having a pair of spaced apart side rails;

each of said side rails having a track;

said support structure having a pair of spaced apart side elements; and each of said side elements having means for engaging and cooperating with one of said tracks to allow said axial movement of said support structure.

3. A system according to claim 2, wherein each said track is formed by a longitudinally extending slot in a respective side rail.

4. A system according to claim 2, wherein said support structure further comprises a sheave over which said tow cable passes and a support arm extending from each of said side elements to support said sheave.

5. A system according to claim 1, further comprising side arms attached to said support frame to support said winch.

6. A system according to claim 1, further comprising control devices mounted to said support frame.

7. A system according to claim 1, further comprising means for connecting said support frame to a floor of said aircraft.

8. A system according to claim 1, wherein said support frame has a longitudinal axis and said longitudinal axis is coincident with a center line of said aircraft.

9. A system according to claim 1, wherein said system is modular and self-contained.

10. A system for deploying and retrieving an external load from an aircraft comprising:

a support frame;

a winch connected to said support frame;

a tow cable wound around said winch, said tow cable being connected to said external load;

a support structure connected to said support frame, said support structure being axially movable relative to said support frame for moving said external load so as to control the center of gravity of said aircraft;

means for moving said support structure relative to said support frame;

said support frame having a pair of spaced apart side rails;

each of said side rails having a track;

said support structure having a pair of spaced apart side elements;

each of said side elements having means for engaging and cooperating with one of said tracks to allow said axial movement of said support structure; and an energy absorbing member extending between said side rails, said energy absorbing member acting as a forward crash restraint for said external load.

11. A system for deploying and retrieving an external load from an aircraft comprising:

a support frame;

a winch connected to said support frame;

a tow cable wound around said winch, said tow cable being connected to said external load;

a support structure connected to said support frame, said support structure being axially movable relative to said support frame for moving said external load so as to control the center of gravity of said aircraft;

control devices mounted to said support frame;

said support structure including a sheave over which said tow cable passes; and said control devices including rotation and linear sensors for synchronizing linear motion of said sheave with motion of said winch.

12. A system according to claim 11, wherein said control devices further comprises at least one video camera for monitoring deployment and retrieval of said external load.

13. A system for deploying and retrieving an external load from an aircraft comprising:

a support frame;

a winch connected to said support frame;

a tow cable wound around said winch, said tow cable being connected to said external load;

a support structure connected to said support frame, said support structure being axially movable relative to said support frame for moving said external load so as to control the center of gravity of said aircraft;

means for connecting said support frame to a floor of said aircraft; and said connecting means comprising at least one shear and tension connections.

14. A system for deploying and retrieving an external load from an aircraft comprising:

a support frame;

a winch connected to said support frame;

a tow cable wound around said winch, said tow cable being connected to said external load;

a support structure connected to said support frame, said support structure being axially movable relative to said support frame for moving said external load so as to control the center of gravity of said aircraft; and a removable shield positioned over said support frame.

15. A system for deploying and retrieving an external load from an aircraft comprising:

a support frame;

a winch connected to said support frame;

a tow cable wound around said winch, said tow cable being connected to said external load;

a support structure connected to said support frame, said support structure being axially movable relative to said support frame for moving said external load so as to control the center of gravity of said aircraft; and a barrier in front of and adjacent to said support frame to reduce noise, reduce hazards and control helicopter environment.

16. A system for deploying and retrieving an external load from an aircraft comprising:

a support frame;

a winch connected to said support frame;

a tow cable wound around said winch, said tow cable being connected to said external load;

a support structure connected to said support frame, said support structure being axially movable relative to said support frame for moving said external load so as to control the center of gravity of said aircraft; and a tow boom pivotably movable relative to said aircraft.

17. A system according to claim 16, wherein said tow boom is pivotably connected to said support structure.

18. A system according to claim 16, wherein said tow boom includes a pair of support legs and a tow ball capture device connected to said support legs.

19. A system according to claim 18, wherein each of said support legs has a first leg portion and a second leg portion connected to said first leg portion by a pivotal connection.

20. A system according to claim 19, wherein at least one of said first and second leg portions of each of said support legs has a load cell and a yaw sensor incorporated therein to provide automatic tow tension indication.

21. A system according to claim 18, wherein said tow ball capture device includes a tow hook and a pyrotechnic cable cutter.

22. A system according to claim 16, wherein said tow boom is positioned above said external load when said external load is in a transport mode and said tow boom moves into a rigid truss configuration when said external load is being deployed.

23. A system according to claim 16, further comprising at least one remote video camera attached to said tow boom for monitoring deployment and retrieval of said external load.

24. A system according to claim 16, wherein a portion of said tow boom forms an aperture guard for said tow cable.

25. A system according to claim 16, further comprising a containment device attached to said tow boom.

26. A system for deploying and retrieving an external load from an aircraft comprising:

a support frame;

a winch connected to said support frame;

a tow cable wound around said winch, said tow cable being connected to said external load;

a support structure connected to said support frame, said support structure being axially movable relative to said support frame for moving said external load so as to control the center of gravity of said aircraft;

a tow boom pivotably movable relative to said aircraft; and pivotal connections for allowing pivotal movement of said tow boom and a pitch sensor incorporated into each of said pivotal connections.

27. A method for deploying and retrieving an external load from an aircraft comprising the steps of:

providing a self contained modular deployment and retrieval system which includes a support frame, a winch connected to said support frame, an axially movable support structure for supporting a sheave, and at least one actuator attached to said support frame and said axially movable support structure;

passing a tow cable on said winch over said sheave and connecting an end of said tow cable to said external load; and moving said support structure from a retracted position to a deployed position by actuating said at least one actuator so that the external load passes through an opening in said aircraft.

28. A method according to claim 27, wherein said moving step comprises moving said support structure along an axis coincident with a center line of said aircraft.

29. A method according to claim 27, further comprising lowering said external load to a desired position.

30. A method according to claim 27, wherein said external load comprises a towed body used in a mine hunting operation and said lowering step comprises lowering said towed body into contact with water beneath the aircraft.

31. A method according to claim 30, further comprising moving said aircraft so as to tow said towed body through said body of water.

32. A method according to claim 29, wherein said external load comprises a rescue basket and said lowering step comprises lowering said rescue basket.

33. A method according to claim 27, wherein said external load comprises firefighting equipment and said lowering step comprises lowering said firefighting equipment.

34. A method according to claim 27, further comprising retrieving said external load by winding said tow cable onto said winch.

35. A method according to claim 34, further comprising moving said support structure from said deployed position to said retracted position after said external load has been aligned with said opening in said aircraft.

36. A method according to claim 34, further comprising providing a tow boom and positioning said tow boom above said external load when said external load is in a transport mode.

37. A method according to claim 36, further comprising pivoting said tow boom downwardly into a lockable truss configuration during said external load lowering step.

38. A method according to claim 37, further comprising capturing said tow cable with said tow boom as said external load is being lowered.

39. A method according to claim 37, further comprising folding said tow boom as said external load is being retrieved into said aircraft and moving said folded tow boom to said position above said external load.

40. A helicopter having a fuselage and an opening in said fuselage through which an external load is deployed, said helicopter comprising:
    a self contained, modular deployment and retrieval system secured to said fuselage; and
    said self contained, modular deployment and retrieval system including a support frame secured to said fuselage, a movable support structure for supporting a sheave connected to said support frame for movement relative to said support frame between a retracted position and a deployed position where said external load extends through said opening, and a pair of actuators for moving said support structure relative to said support frame, each of said actuators being connected to said support frame at one end and to said support structure at a second end.

41. A helicopter according to claim 40, wherein said support frame has a longitudinal axis and said longitudinal axis is aligned with a center line of said aircraft.

42. A helicopter according to claim 40, wherein said deployment and retrieval system further comprises a winch attached to said support frame and said winch having a tow cable which is connected at one end to said external load and which passes over said sheave.

43. A helicopter according to claim 40, wherein said deployment and retrieval system further comprises control devices mounted to said support frame.

44. A helicopter according to claim 40, wherein said deployment and retrieval system further comprises:
    said support frame having a pair of spaced apart side rails;
    each of said side rails having a track;
    said support structure having a pair of side elements; and
    each of said side elements having means for engaging and cooperating with said track of a respective one of said side rails.

45. A helicopter according to claim 40, wherein said deployment and retrieval system further comprises a winch having a tow cable wound thereon, said tow cable being connected to said winch and to said external load, and a tow boom for capturing said tow cable as said external load is being deployed.

46. A helicopter according to claim 45, wherein said tow boom has a tow hook and a pyrotechnic cable cutter.

47. A helicopter according to claim 45, wherein said tow boom has means for detecting tow tension in said cable.

48. A helicopter according to claim 47, wherein said detecting means comprises at least one load cell and at least one yaw sensor.

49. A helicopter according to claim 45, further comprising means for detecting the pitch of said tow boom.

50. A helicopter according to claim 45, further comprising at least one video camera attached to said tow boom.

51. A helicopter according to claim 40, wherein said external load comprises a towed body for use in a mine hunting operation.

* * * * *